US012594808B2

(12) United States Patent
Dasher

(10) Patent No.: US 12,594,808 B2
(45) Date of Patent: Apr. 7, 2026

(54) INGRESS PREDICTION AND DETECTION WITH INTELLIGENT VEHICLE RESPONSE AND WHEEL APPARATUS

(71) Applicant: Adeia Guides Inc., San Jose, CA (US)

(72) Inventor: Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/219,254

(22) Filed: May 27, 2025

(65) Prior Publication Data

US 2025/0282195 A1     Sep. 11, 2025

Related U.S. Application Data

(62) Division of application No. 18/529,609, filed on Dec. 5, 2023, now Pat. No. 12,344,063.

(51) Int. Cl.
B60G 17/056     (2006.01)
B60G 17/019     (2006.01)

(52) U.S. Cl.
CPC ....... B60G 17/0565 (2013.01); B60G 17/019 (2013.01); *B60G 2500/30* (2013.01); *B60G 2800/914* (2013.01)

(58) Field of Classification Search
CPC ........................... B60G 17/017; B60G 17/019; B60G 17/0565; B60G 2500/30; B60G 2800/20; B60G 2800/914; B60G 2400/82; B60G 2400/823; B60G 2204/113
See application file for complete search history.

(56) References Cited

U.S. PATENT DOCUMENTS

| | | | | |
|---|---|---|---|---|
| 4,274,091 A | * | 6/1981 | Decker ................... | G01W 1/17 |
| | | | | 250/341.7 |
| 5,353,020 A | * | 10/1994 | Schurmann ......... | B60C 23/0428 |
| | | | | 340/448 |
| 6,015,155 A | * | 1/2000 | Brookes ............. | B60G 17/0185 |
| | | | | 701/91 |
| 6,650,244 B1 | * | 11/2003 | Chen ...................... | G08B 21/20 |
| | | | | 340/463 |
| 7,164,365 B2 | * | 1/2007 | Doherty ........... | G08G 1/096816 |
| | | | | 340/580 |
| 7,375,625 B2 | * | 5/2008 | Fujioka ............... | B60C 23/0408 |
| | | | | 340/447 |
| 7,808,256 B2 | * | 10/2010 | Murakami ........... | G01N 27/041 |
| | | | | 73/146 |

(Continued)

*Primary Examiner* — Laura Freedman
(74) *Attorney, Agent, or Firm* — HG LAW LLP

(57)     ABSTRACT

Two or more sensors positioned at a wheel of a stopped vehicle may detect an unwanted substance, and transmit signals, based on which a height level of the substance is determined. The system may also determine a type of the substance, such as water, snow, sand or mud, based on electrical resistance of the substance detected by the sensors. Cameras or other imaging equipment, including LIDAR, may also be used to determine the substance height and/or composition. Accordingly, actions to protect the vehicle may be taken, such as raising or lowering the ride height of the vehicle body using an adjustable suspension of the vehicle. Other protective actions may include closing vents, seals, valves and battery isolation units, and transmitting messages to a vehicle driver and/or to emergency personnel.

20 Claims, 8 Drawing Sheets

(56) References Cited

U.S. PATENT DOCUMENTS

| | | | | |
|---|---|---|---|---|
| 9,026,310 B2 * | 5/2015 | Tran | B60G 17/01908 367/908 |
| 9,046,457 B2 * | 6/2015 | Hanatsuka | B60W 40/06 |
| 9,206,637 B2 * | 12/2015 | Percher | G06F 17/00 |
| 9,227,479 B2 * | 1/2016 | Clarke | B60W 30/18009 |
| 9,302,586 B2 * | 4/2016 | Tran | B60W 40/076 |
| 9,399,473 B2 * | 7/2016 | Hoare | B60W 50/14 |
| 9,533,575 B2 * | 1/2017 | Tran | B60Q 1/00 |
| 9,597,961 B2 * | 3/2017 | Tran | G01F 23/14 |
| 9,637,132 B2 * | 5/2017 | Clarke | F02N 11/0837 |
| 9,815,369 B2 * | 11/2017 | Tran | B60W 40/06 |
| 9,821,659 B2 * | 11/2017 | Tran | G01F 23/28 |
| 9,827,853 B2 * | 11/2017 | Tran | G06F 7/00 |
| 9,884,555 B2 * | 2/2018 | Tran | B60Q 1/00 |
| 9,908,379 B2 * | 3/2018 | Guest | B60G 17/0165 |
| 10,414,235 B1 * | 9/2019 | Yassan | G01S 7/539 |
| 10,569,785 B2 * | 2/2020 | Dudar | B60G 17/0195 |
| 10,589,742 B2 * | 3/2020 | Dudar | G06T 7/50 |
| 10,780,821 B2 * | 9/2020 | Michalakis | B60K 35/53 |
| 11,560,033 B2 * | 1/2023 | Yamazaki | B60W 40/068 |
| 12,344,063 B2 * | 7/2025 | Dasher | B60G 17/017 |
| 2021/0213976 A1 * | 7/2021 | Salter | G05D 1/0291 |
| 2024/0131879 A1 * | 4/2024 | Jain | B60C 23/0493 |
| 2024/0253637 A1 * | 8/2024 | Feroz | B60L 15/2063 |

* cited by examiner

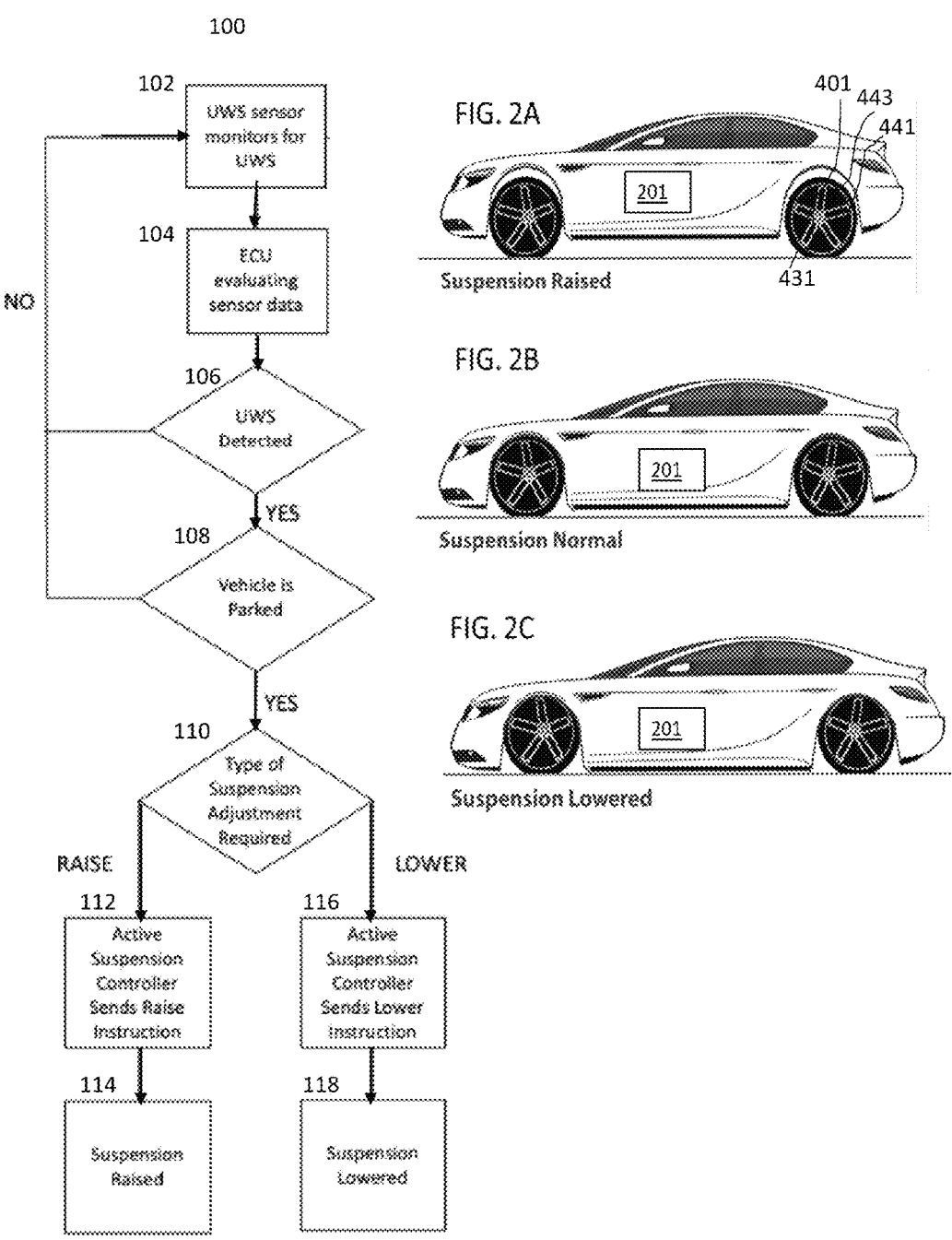

102 — UWS sensor monitors for UWS

104 — ECU evaluating sensor data

106 — UWS Detected

108 — Vehicle is Parked

110 — Type of Suspension Adjustment Required

NO

YES

YES

RAISE

LOWER

112 — Active Suspension Controller Sends Raise Instruction

116 — Active Suspension Controller Sends Lower Instruction

114 — Suspension Raised

118 — Suspension Lowered

Suspension Raised

Suspension Normal

Suspension Lowered

Inner ring probe 431b

Outer ring probe 431a

Conductivity is measured between the outer and inner ring

401

401  409  405  403

441  439  437

443  401

445

447  449

Derived water level 450

431

Detection 1  Detection 2  Detection 3  433  435

700

702 monitor for UWS signal from sensors

704 Signal received indicating UWS at wheel?

No

Yes

706 Determine height level of UWS

708 Determine type of UWS 710 is UWS a threshold height level?

No

Yes

712 Determine protective action

714 Transmit action signal

716 Transmit notification

INGRESS PREDICTION AND DETECTION WITH INTELLIGENT VEHICLE RESPONSE AND WHEEL APPARATUS

CROSS-REFERENCE TO RELATED APPLICATIONS

This application is a divisional of U.S. patent application Ser. No. 18/529,609, filed on Dec. 5, 2023. The disclosures of the referenced application are hereby incorporated by reference herein in its entirety.

BACKGROUND

The present disclosure relates to taking actions to protect a vehicle, such as a parked vehicle, from water, snow, sand or other accumulations of substances at the vehicle, based on detection of the accumulations of substances at the wheels.

SUMMARY

Parked vehicles face a variety of risks, particularly when left in an unattended state. Flooding, deep snow, sand storms, and mud can damage a vehicle or can accumulate under or around the vehicle and get the vehicle stuck.

In one approach, under certain conditions, using the suspension system of the vehicle the ride height of the vehicle is raised so that the vehicle body is elevated farther away from the ground. This may be used, for example, when the vehicle is wading through water or muddy terrain. However, the vehicle may be more vulnerable when the vehicle is stopped as water or other substances can gradually accumulate around. Also, a parked vehicle may be unattended and unmonitored. In addition, a vehicle body may be raised in response to detection of water during wading but the vehicle body would never be lowered below normal ride height in response to wading. Further, while the vehicle is wading through water, a sensor on a wheel would be impractical because the wheel is constantly spinning and thus the location of the detection of the water would be unknown. Moreover, during wading, water is being swept up by the wheels and being splashed by other parts of the vehicle. Thus, a sensor on a wheel may not yield useful information regarding the location of the detection of the water at the wheel.

According to another approach, water level sensors are positioned on a body of the vehicle, for example, to detect an ambient water level. But such water level sensors are typically positioned too high on the vehicle to be able to provide early warning of flooding or other material building up around the vehicle. Often sensors are positioned so high above ground level that a flood or rising water can cause damage to the vehicle. Also, sensors often provide a binary signal: either a relatively high water level is detected to trigger a wading operation by the vehicle, or no water level signal is provided. Sensors may be positioned in a wheel well but a detection by such sensors may not provide early warning about an accumulating unwanted substance.

Also, a sensor may detect water but may not discern the type of substance accumulating around the vehicle. Without this type of granular information, it may be impossible to determine what kind of protective action is appropriate for the vehicle. For example, a high water level at the vehicle may warrant elevating the ride height of the vehicle body to avoid flood damage, while a high snow level at the vehicle may warrant lowering the vehicle to avoid getting stuck in snow accumulation beneath the vehicle body.

According to an aspect of the disclosure as described herein, sensors may be positioned at one or more wheels of a vehicle to detect water or other material buildup at the vehicle. The sensors may detect the height level of the water or other buildup, and may determine the type of substance—water, snow, ice, mud, sand, dust, or the like. The sensors may detect electrical conductivity and/or temperature of the buildup and, accordingly, the sensors may transmit signals, for example, nearfield wireless radio frequency signals, such as Bluetooth, to a data processor onboard the vehicle, such as to an electronic control unit (ECU) of the vehicle.

In response to the substance height determination and the substance composition determination, the system may instruct one or more protective actions for the vehicle. Such protective actions may include, for example, using the suspension system of the vehicle to elevate or to lower the ride height of the body of the vehicle, or portions thereof, relative to a current ride height of the vehicle body or relative to a normal parked ride height of the vehicle body. The system may in addition, or instead, command further protective actions, including one or more of closing/opening one or more vehicle vents, such as radiator air vents, shutting off/turning on one or more vehicle systems, for example, heating or cooling systems, closing/opening one or more valves, such as heater valves, disconnecting one or more batteries, transmitting a message requesting intervention by a vehicle driver/owner and/or by emergency personnel, and the like.

Two or more sensors may be positioned on, or in, a wheel rim (e.g., equidistant from a center of the wheel), or may be positioned on or at the hubcap of the wheel. Each sensor may include a pair of probes to measure electrical conductivity of the substance at the wheel. Sensors may also include a thermometer or other temperature sensor, a camera, charge couple device (CCD), spectrometer, LIDAR or other imaging equipment, to help identify the height level of the substance at the wheel and the type of substance at the wheel. According to the height level determined, the system may then transmit command to vehicle components to take one or more of the previously discussed or other protective actions.

Facilitating ongoing determination of height level of substances, the sensors may continue to monitor conditions and may continue to transmit data about the conditions. A first sensor may detect a substance at a first time and a second sensor may detect no substance at the first time. At a subsequent time, both the first and the second sensors may detect the substance. Based on such data, the system may determine that the wheel of the stopped vehicle is positioned such that the first sensor is lower than the second sensor. Since the distance between sensors is known in advance, the rate of accumulation of the substance may be determined. The sensors may also determine whether the buildup is at more than one wheel of the vehicle, and thus determine whether the substance is accumulating only locally, if only the sensors at one wheel detect accumulation, or at all the wheels. Knowing which wheel's sensors have detected the unwanted substance may allow the system to decide appropriate protective actions. For example, snow may accumulate on a first side of a vehicle parked at a curb as snow is shoveled off the sidewalk on the first side of the vehicle. In response to sensors on the first side detecting unwanted substance accumulation and the ECU determining that the snow is likely snow, the ECU may command the suspension systems at the wheels on the first side of the vehicle to lower the vehicle body to prevent further snow accumulation under the vehicle. At the same time, if sensors at the wheels on the second side of the vehicle determine no substantial snow level, then the ECU may maintain the suspension systems at the wheels on the second side of the vehicle at a normal height. By not lowering the second side of the vehicle body, the vehicle body may get less dirty as other vehicles pass on the second side of the vehicle and splash dirty wet snow and salt that had been deposited on the road surface (to prevent the snow freezing to the pavement).

Based on the signals received from the sensors, the onboard data processor may determine the height level of the buildup of the substance in contact with the wheel(s) and may determine the composition of the buildup material. The composition of the substance may be determined based on sensor data including electrical conductivity of the substance, a temperate of the substance, a rate of accumulation of the substance, photographic image analysis of the substance, the variation in the substance as detected at various sensors of the vehicle and at various times, weather and/or other news report data and/or other such data. Identifying the substance type may allow the ECU to make better decisions regarding what protective action(s) to take. For example, if the substance is determined to be water then the ECU may command raising the vehicle body to prevent or to reduce damage to the battery, the engine, other components and systems, and the vehicle body itself. On the other hand, if the ECU determines that the substance is snow or sand, then the ECU may command lowering the vehicle body to prevent accumulation under the vehicle that could interfere with wheel traction or that could contact the bottom of the vehicle body to ground the vehicle.

Disclosed are an apparatus, system, method, means for implementing the method, and a non-transitory computer-readable medium comprising instructions that, when executed by a processor, implement the method. The method may include receiving signals from two or more sensors positioned on a wheel of a stopped vehicle; based on the received signals, a height level of a substance in contact with the wheel may be determined; also based on the received signals, the system may determine a type of the substance; and then the system may determine a protective ride height for at least a portion of the vehicle based on the height level of the substance and the type of the substance. An adjustable suspension of the vehicle may then adjust a current ride height of the vehicle to the protective ride height.

In one configuration, a first sensor of the two or more sensors is be positioned at a first radial distance from a center of the wheel, and a second sensor of the two or more sensors may be positioned at the same first radial distance from the center of the wheel and spaced remote from the first sensor. In this configuration, the determining of the height level of the substance in contact with the wheel may entail determining that the substance is in contact with both the first and second sensors. The determining the protective ride height may include determining, based on the type of substance in contact with the wheel being water, a raised ride height relative to a normal stopped ride height. A third sensor may also be positioned at the same first radial distance from the center of the wheel and spaced remote from the first sensor and from the second sensor. The determining of the height level of the substance in contact with the wheel may then entail determining that the substance is in contact with the third sensor, with the second sensor and with the first sensor, and in this case the ride height may be raised to a highest position obtained by the adjustable suspension. In addition, if it is first determined that the substance is in contact with the first sensor and that the second sensor is free of contact with the substance, and later it is determined that the first sensor and the second sensor are in in contact with the substance, then an accumulation rate of the substance may be calculated based on a time interval between the first time and the second time. Based on the accumulation rate, a message may be transmitted to a device, such a mobile telephone of a driver or emergency personnel, remote from the vehicle.

In the configuration in which the first and second sensors are each positioned at a first radial distance from a center of the wheel and spaced remote from each other, the height level of the substance in contact with the wheel may be determined by determining contact of the substance with the first sensor and second sensors, and the determining the protective ride height may entail determining, based on the type of substance in contact with the wheel being snow or sand, a lowered ride height relative to a normal stopped ride height. The lowered ride height may be a lowest position obtained by the adjustable suspension. The two or more sensors may be positioned at a rim of the wheel.

Also contemplated are an apparatus, system, method, means for implementing the method, and a non-transitory computer-readable medium comprising instructions that, when executed by a processor, implement the method. The apparatus may include a vehicle wheel that has a first sensor positioned at a rim of the wheel at a first distance from a center of the wheel. The first sensor may include first probes that can detect electrical conductivity of a substance in contact with the wheel, and a second sensor also positioned at the rim of the wheel at the first distance from the center of the wheel and spaced remote from the first sensor and also having probes that can detect the electrical conductivity of the substance. A wireless transmitter may be connected to the first and second sensors and may transmit signals indicating the electrical conductivity detected by the first sensor and the electrical conductivity detected by the second sensor.

For example, the first sensor and the second sensor each may include a temperature sensor and/or other sensors. An orientation sensor may also be included at the wheel to detect an orientation of the wheel in its current rotational position.

A third sensor may be additionally positioned at the rim of the wheel at the same first distance from the center of the wheel and spaced equidistant from the first sensor and from the second sensor. The first sensor may also be positioned equidistant from the second sensor and from the third sensor. The third sensor may also include probes that can detect the electrical conductivity of the substance in contact with the wheel. In an embodiment, one probe of one or more of the sensors may be positioned at an inner ring of the rim of the wheel, and another probe of that sensor may be positioned at an outer ring of the of the rim of the wheel.

In an embodiment, an onboard data processor, such as an electronic control unit of the vehicle, may positioned and configured to receive the signals indicating the electrical conductivity detected by the first sensor and the electrical conductivity detected by the second sensor. Then, the onboard data processor may determine a protective action for the vehicle based on the signals received.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 1 illustrates an example of a process for detecting an unwanted substance (UWS) at a vehicle and for taking steps to protect the vehicle, including the options to raise or to lower the vehicle body, and possible additional protective actions, according to an aspect of the disclosure;

FIGS. 2A-2C illustrate, respectively, a raised ride height, normal parked ride height and lowered ride height of a vehicle, according to an aspect of the disclosure;

DETAILED DESCRIPTION

Figure 3:
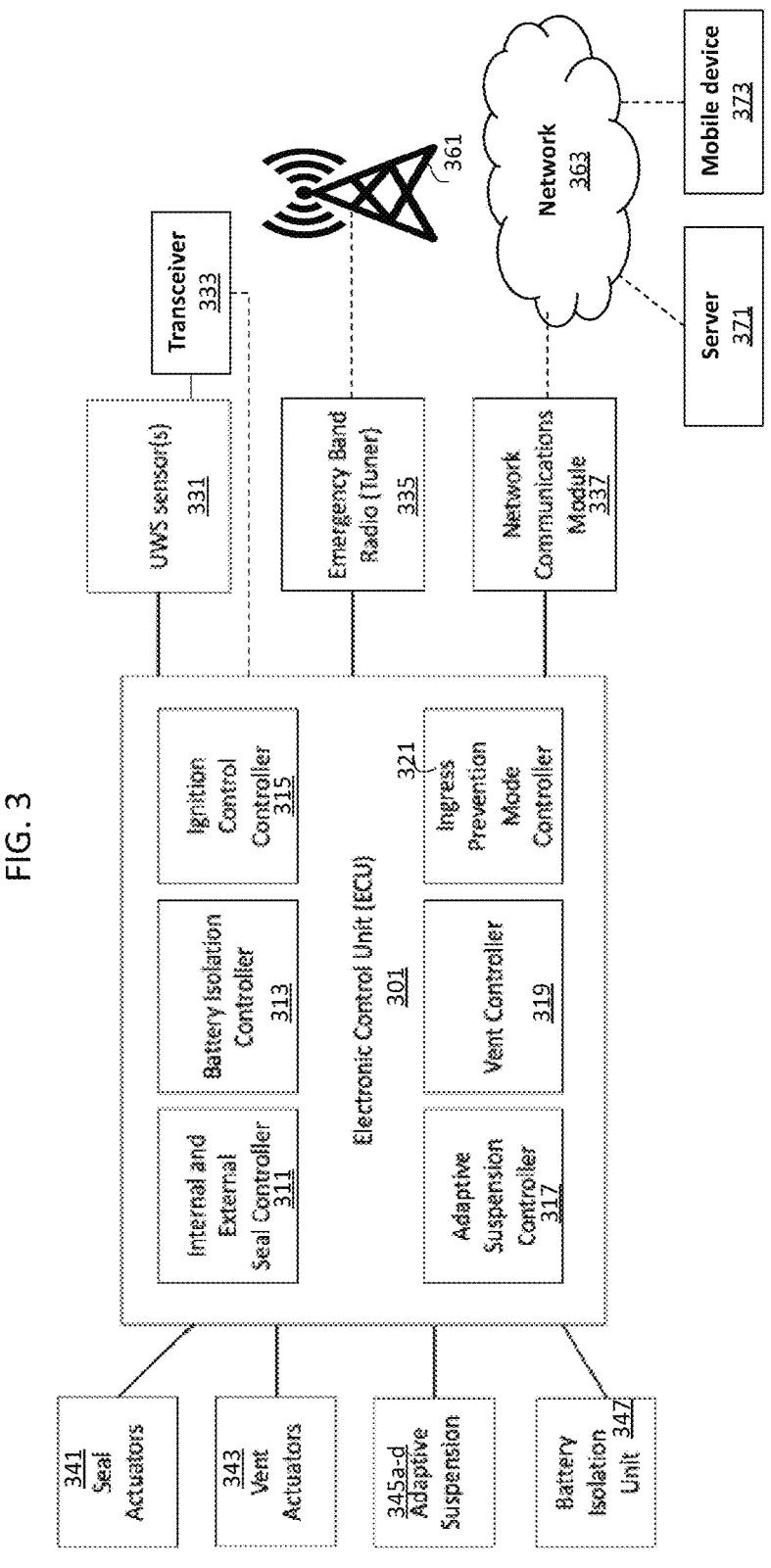
FIG. 3 illustrates an electronic control unit (ECU) of a vehicle together with other vehicle systems, and also shows nodes in communication with the ECU, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

FIG. 1 illustrates an example of a process for determining an unwanted substance and taking steps for protecting a vehicle 201, according to an aspect of the present disclosure. While depicted in some of the figures as a sedan, the term vehicle may encompass other types of automobiles, SUVs, vans, buses, trucks, tractors, motorcycles, including hybrid and electric vehicles, or the like. Some of the discussion describes a vehicle with four wheels, however, vehicles with more or fewer than four wheels are also contemplated. The term parked may sometimes be used to refer to the state of the vehicle, however, it will be understood that the vehicle may be stopped or slowed or moving without departing from the spirit of the disclosure.

A process as illustrated in FIG. 1 may be commenced automatically in response to one or more sensor signals indicating that a sensor at one or more wheels has detected an unwanted substance. A parked car, for an example, an electric vehicle, with the engine or motor turned on or off, may keep one or more sensors always turned on. Each sensor may be powered by its own battery or all sensors of or on a wheel may share the same power source. A smaller number of sensors, for example one sensor, or all sensors of a wheel, for example, at only one wheel of a four wheel vehicle, may be left on at all times, and detection by the sensor(s) of an unwanted substance (UWS) may trigger it to transmit a notification to an onboard processor, such as an electronic control unit (ECU), which, in turn, may transmit notification to the other sensors at the wheels to "wake up" and begin monitoring for unwanted substances (UWS), or the notification from the initial sensor(s) may be transmitted directly to the remaining sensor so as to wake up the remaining sensors.

Aspects of the disclosure will now be described with reference to FIGS. 1 and 2A-2C. As shown at 102 of FIG. 1, one or more sensors positioned at a wheel 401 of vehicle 201 illustrated in FIGS. 2A-2C, may monitor for detection of an unwanted substance (UWS). Detection of an UWS by a first UWS sensor 431 may cause it to alert other UWS sensors by direct transmission to sensors or indirectly, by way of transmission to onboard ECU 301, which may then transmit a wake up signal to other UWS sensors. From this point on, other UWS sensors would also be monitoring for the UWS.

At 104, the ECU 401 may receive data from one or more UWS sensors. The UWS sensors may transmit the data periodically or upon detection of a threshold level of UWS. Or the UWS sensors may transmit the data in response to request of the ECU 401. The ECU 401 evaluates the sensor data and may make a separate determination of the height level of the UWS for each UWS sensor. The ECU 401 may determine the composition of the UWS after or substantially contemporaneously with determining the height level of the UWS, or may make the composition determination only if the height level of the UWS is determined to be a threshold height. For example, a threshold height may be a height in which more than one sensor at a wheel detects the presence of UWS. Or a threshold may be a specific height level from the ground, for example 10-20 centimeters from the ground.

At 106, the ECU 401 determines whether UWS is detected. In an embodiment, the ECU 401 determines that the UWS is present and takes action only if the threshold height level is determined. If no substantial UWS is detected then processing returns to 102. Otherwise processing continues to 108.

At 108, the ECU 401 may determine whether the vehicle 201 is parked. For example, the vehicle 201 may be stopped but not parked, as indicated by the gear shift stick being in drive gear or in a gear other than parked, as indicated by activation of a brake pedal, or as indicated by recent vehicle motion accessed by the ECU in an electronic vehicle history. Or, the vehicle may be in motion and one or more sensors may have detected UWS. In an embodiment, the sensors are disabled when the vehicle 201 is not in parked stated. In a further embodiment, the sensors and the vehicle protection system are enabled automatically when the ignition and/or primary electric motor is off and/or when the vehicle is determined to be free of a driver and passengers. The ECU 301 may determine that the vehicle is free of the driver and passengers based on seat weight sensors, seat belt buckle latched/open sensors, cameras or the like, vehicle doors opening/closing or the like.

In an embodiment, if the vehicle is not parked, then no further automatic action may be required because the driver is likely present and may take protective actions for the vehicle. Thus, if at 108 the vehicle is determined not to be parked, then processing continues to 110; otherwise ("no" at 108), processing returns to 102 if the vehicle is determined to be parked.

At 110, the ECU 401 determines a type of vehicle protection action warranted based on the determination by the ECU 401 of the height of the UWS and based on the determination by the ECU 401 of the composition of the UWS. The ECU 301 may determine the ride height adjustment, by controlling the suspension systems of the vehicle, which may be warranted for the vehicle, as shown in FIGS. 1 and 2A-2C. In embodiment, if the type of substance cannot be determined based on the data from the sensor, then by default the action may be to raise the vehicle body. For example, one or more cameras may be out of order or out of focus. In an embodiment, if the UWS height level and the type of substance is not determined then the vehicle body is always raised to a maximum height.

At 112, the system may transmit a signal to the adjustable suspension system at one or more of the wheels to raise the vehicle body. The adjustable suspension systems at each wheel of the vehicle may work independently to raise or to lower the vehicle body, and thus the vehicle body may be thought of as having four parts that may be raised or lowered. That is, if the suspension system at the left front wheel alone raises the vehicle body, then the left front portion of the vehicle body is raised while the rest of the vehicle body remains where it was. The system may command raising the vehicle body in response to a determination by the ECU that the height of the unwanted substance detected at the wheel or wheels may damage one or more components or systems of the vehicle or the vehicle body, for example, in response to a determination that the substance is water.

At 114, the adjustable suspension systems at each wheel, or at fewer than all the wheels, may raise the vehicle body to an elevated ride height. Monitoring may then return to 102. According to an embodiment, if after a period of time, for example 1-90 minutes, no unwanted substance is detected by the sensors at the vehicle wheels, or if no unwanted substance at a threshold height level that would trigger the raising of the suspension or the taking of other protective action is determined by the sensors at the vehicle wheels, then the system may command that the suspension system return the ride height to the normal parking ride height.

On the other hand, if at 110 the system determines that the ride height of the vehicle body, or one or more portions thereof, is to be lowered, then processing proceeds to 116. At 116, the system instructs lowering the vehicle body or one or more portions thereof.

At 118, the adjustable suspension systems lower the vehicle body. In an embodiment, one portion of the vehicle body, for example the first side of the vehicle body, may be raised, while a second side of the vehicle body may be lowered. For example, this may be desirable if people are shoveling snow from the sidewalk to the second side of the vehicle, while traffic continues on the first side of the vehicle which might splash dirt or road salt onto the first side.

FIG. 3 is a schematic illustration of components of the vehicle 201, including the electronic control unit ECU 301. One or more of components of the vehicle 201, including controllers 311-321, may be integrated with the ECU 301 or may be logically connected thereto. Communication between the ECU 301 and one or more other components, including the unwanted substance sensors (UWS) 331, may be via wireless or wired connection. FIG. 3 shows transceiver 333 connected to the UWS sensors 331 for communicating with the ECU 301 and/or with one or more devices, for example, with a portable device, such as a mobile telephone of the driver. Each UWS sensor 331 may be integrated with, or be connected to, a transceiver 333, or all the UWS sensors 331 of a wheel may share the same transceiver 333. Thus, for example, in a vehicle with four wheels, there may be four such transceivers 333. Or, only two of the wheels of the vehicle, that is, one wheel on each side of the vehicle, may have UWS sensors, and all sensors on each wheel may share a transceiver 333.

As shown in FIG. 3, the vehicle 201 may include an internal and external seal controller 311, a battery isolation controller 313, an ignition controller 315, an adaptive suspension controller 317, a vent controller 319, and an ingress prevention mode controller 321, which control respective actuators and systems of the vehicle 201. The ingress prevention mode controller 321 may be a module of the ECU 301 that manages vent controller 319, battery isolation controller 313, and/or internal and external seal controller 311.

UWS sensors 431-449 may be positioned at one or more wheels 401a-401d of the vehicle 201 and may transmit to the ECU 301 data regarding UWS at each sensor. Each UWS sensor 431, 433, 435, 437, 439, 441, 443, 445, 447, 447 may include, or may be connected to, a radio frequency transceiver, such as a near-field transceiver, for example, a Bluetooth transceiver, for communicating with the ECU 301. Or, several UWS sensors may be connected and share an RF transceiver for communicating with the ECU 301. Periodically, upon request for data by the ECU 301, upon a UWS 331 detecting UWS, or upon the occurrence of other events, one or more UWS sensors may transmit UWS detection data to the ECU 301. While 10 UWS sensors are illustrated for the wheel 401, more than 10 or fewer than 10 sensors may be provided. Some sensors may be positioned in the inner rim of the wheel 401 and some on the outer rim of the wheel 401. In an embodiment, the sensors may be positioned substantially equidistant from the center of the wheel 401 and equidistant from each other to facilitate the ECU 301 determining height level of the UWS.

The ECU 301 may also receive external data information, for example, from emergency band radio tuner 335, citizens' band (CB), and/or from network communications module 337, which may be connected to a network such as the internet. The emergency band radio tuner 335, and/or the network communications module 337 that communicates with a server 371 via a network 363, may receive weather or other environmental conditions information, including coastal, river or storm flooding, watermain breaks, avalanches, tsunamis or the like, weather forecast or weather report information, such as an impending snowstorm, sandstorm, or like.

In an embodiment, the ECU 301 may activate the sensors 431-449 automatically in response to notification, for example, of coastal flooding expected for an area in which the vehicle 201 is located. A machine learning model may be used to predict that a weather forecast or report indicates a snow, flooding or other such condition for an area in which the vehicle is located. The ECU 301 may determine that the vehicle 201 is located in the area based on GPS data. In a further embodiment, if the ECU 301 is notified, for example, that a major snowstorm is expected, then the ECU 301 may take protective action earlier in response to detection of snow by the UWS sensors. For example, the ECU 301 may lower the vehicle body upon detection of snow by any one UWS sensor, without waiting for confirmation of the snow height level and/or of the composition of the UWS by a second or third UWS sensor. Or, upon such notification, the ECU 301 may determine by default that the composition of the UWS detected by the sensors is snow, unless the ECU 301 makes a positive determination that the UWS comprises some other substance.

The detectors may be turned on in response to a user turning them on in anticipation of potential threats, for example, based on weather forecasts or other news reports. In a further embodiment, the onboard system may activate the sensors 431-449, or a remote node, such as server 371 or mobile device 373, may make the determination that a weather/news report that indicates a threat condition and may then transmit a notification of the threat condition via network 363 and network communications module 337 to the ECU 301 of the vehicle 201. For example, a machine learning model may be used to predict that a weather forecast or report indicates heavy snow, flooding or some other such threat condition for an area in which the vehicle is located. The server 371 or mobile device 373 may know the location of the vehicle 201 because the ECU 201 may transmit its location to the server 371 or mobile device 373, or the server 371 or mobile device 373 may transmit the notification of the threat condition based on the general area, for example, the city or postal code, in which the vehicle 201 is registered or with which the vehicle is associated. Based on such a notification received by the ECU 301, the ECU 301 may wake up the sensors and/or may take the other precautionary actions described above.

Seal actuators 341, also shown in FIG. 3, may be controlled by internal and external seal controller 311. By way of further example, one or more seals at or around the battery or the exhaust system may be controlled by seal actuator 341.

Also shown in FIG. 3 are vent actuators 343 that may be controlled by vent controller 319. One or more events, such as a radiator vent, air conditioner vent or duct, and/or exhaust vent, may be opened or closed by vent actuators 343. Windows of the vehicle determined to be open may also be closed in this way.

As discussed, adaptive suspension systems 345*a-d* may be used to raise or to lower the ride height of the vehicle body. Adaptive suspension systems 345*a-d* may be controlled by adaptive suspension controller 317.

Battery isolation unit 347, also shown in FIG. 3, may isolate one or more batteries of the vehicle using various means, for example, by closing or sealing a battery compartment. One or more batteries may also be disconnected for safety at this time. Battery isolation unit 347 may be controlled by battery isolation controller 313.

Figures 4A, 4B, 4C:
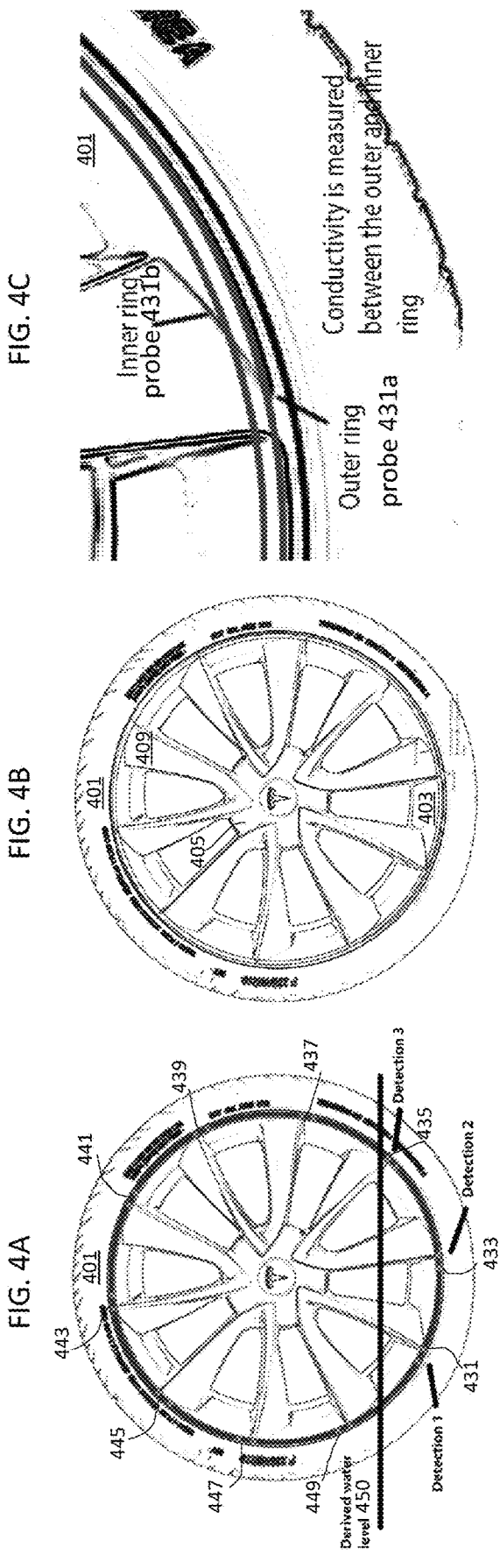
FIGS. 4A-4E illustrate a vehicle wheel and unwanted substance detectors thereon, according to an aspect of the disclosure.

FIGS. 4A-C illustrate a vehicle wheel 401 with a rim 403, a hubcap 405 and spokes 409. As shown in FIG. 4A, one or more sensors 431-449 may be positioned at detection points along the rim 403 or at other portions of the wheel 401.

Sensors 431-449 may each comprise a pair of electrical probes and be positioned on the rim 403 equidistant from each other at an equal radius from the center of the wheel 401, as shown in FIG. 4A. Each sensor may include electrical probes 431*a*, 431*b*, shown by way of example in FIG. 4C as being located at the outer ring of the rim 403 and the inner ring of the rim 403, respectively. The electrical probes 431*a*, 431 may measure a change in electrical resistance between them. The change in electrical resistance may indicate the type of substance or the composition of the substance that is in contact with the wheel. For example, water is electrically conductive, and the increased conductivity compared with air may be detected by the probes 431*a*-431*b*. Snow is a poor electrical conductor. In this way, the composition of the substance may be determined based on the signal detected by the sensors. More or fewer sensors than the number illustrated may be provided. More than one wheel may have sensors and each wheel need not have the same number of sensors. Also, while shown as being deployed at the rim 403 of the wheel 401, in addition or instead, one or more sensors may be provided elsewhere in or on the wheel 401, for example, on the spokes 409 and/or on the hubcap 405. Other types of sensors, including cameras or charge coupled devices, thermometers and temperature sensors, pressure sensors, weight sensors, and the like, as well as combinations of more than one type of sensors, may be provided on or at the wheel, or on or at more than one wheel, to detect substance height levels and/or to distinguish between various types of substance compositions.

The ECU 301 may determine the height level of the UWS by determining an orientation of the wheel 401 based on which UWS sensor first signals contact with the UWS. The UWS sensor that first signals contact with the UWS may be presumed to be the lowest UWS sensor on the wheel 401 in the wheel's current rotational position. In the illustration shown in FIG. 4A this may be UWS sensor 433. As the UWS accumulates and rises, one or more additional UWS sensors may signal contact with the UWS, as shown in FIG. 4A.

In an embodiment, to determine a height level of the UWS, an orientation sensor may also be provided to determine an orientation of the wheel 401. Based on data received from the orientation sensor, the system may determine the height of the UWS sensors in contact with the wheel given the current position of the wheel. The system could then determine the height level of the substance at the wheel, since the location on the wheel of the UWS sensor that detects the UWS is known in advance, and the orientation sensor of the wheel may aid the ECU 301 to locate the UWS sensor in relation to the ground. A level sensor may also be integrated with or connected to each UWS sensor to aid the ECU 301 determine the position of the UWS sensor on the wheel given the current rotational position of the wheel.

Further, based on the electrical resistance of the substance determined by the probes the ECU 301 may determine the composition of the UWS. In an embodiment, photography or other light sensor data may be collected by cameras to aid the system in determining the composition of the UWS and/or weight or pressure of the substance as measured by the sensors and/or the temperature of the substance measured at the sensors, may be used by the system to determine that the substance is water or primarily water. Laser imaging, detection, and ranging (LIDAR) or other imaging detecting may be used to determine the height level of the UWS and the composition of the UWS.

As shown in FIG. 4C, the UWS sensor 431 may include an electrical conductivity sensor, which may include two prongs 431*a*, 431*b* separated by a gap. The electrical conductivity of the UWS in the gap may be determined by the resistance detected between the prongs 431*a*, 431*b*. Pairs of prongs or probes of each sensor may be positioned in, on or at the rim, as shown in FIG. 4A. In an embodiment, as shown in FIG. 4C the first prong or probe 431*a* may be positioned in, on or at an outer ring of the rim 403 of the wheel 401, and the second prong or probe of the sensor 431 may be positioned in, on or at the inner ring of the rim 403 of the wheel 401. One or more sensors may also be positioned at other portions of the wheel 401, such as the hubcap 405 or one or more of the spokes 409. The sensor 431 may incorporate a thermometer or other temperature sensor. The sensor 431 may include a camera or charge couple device (CCD) that captures photographs or detects other image data of the UWS. Such data may be useful for determining a high level of the UWS and/or for determining the composition of the UWS.

Figures 4D, 4E:
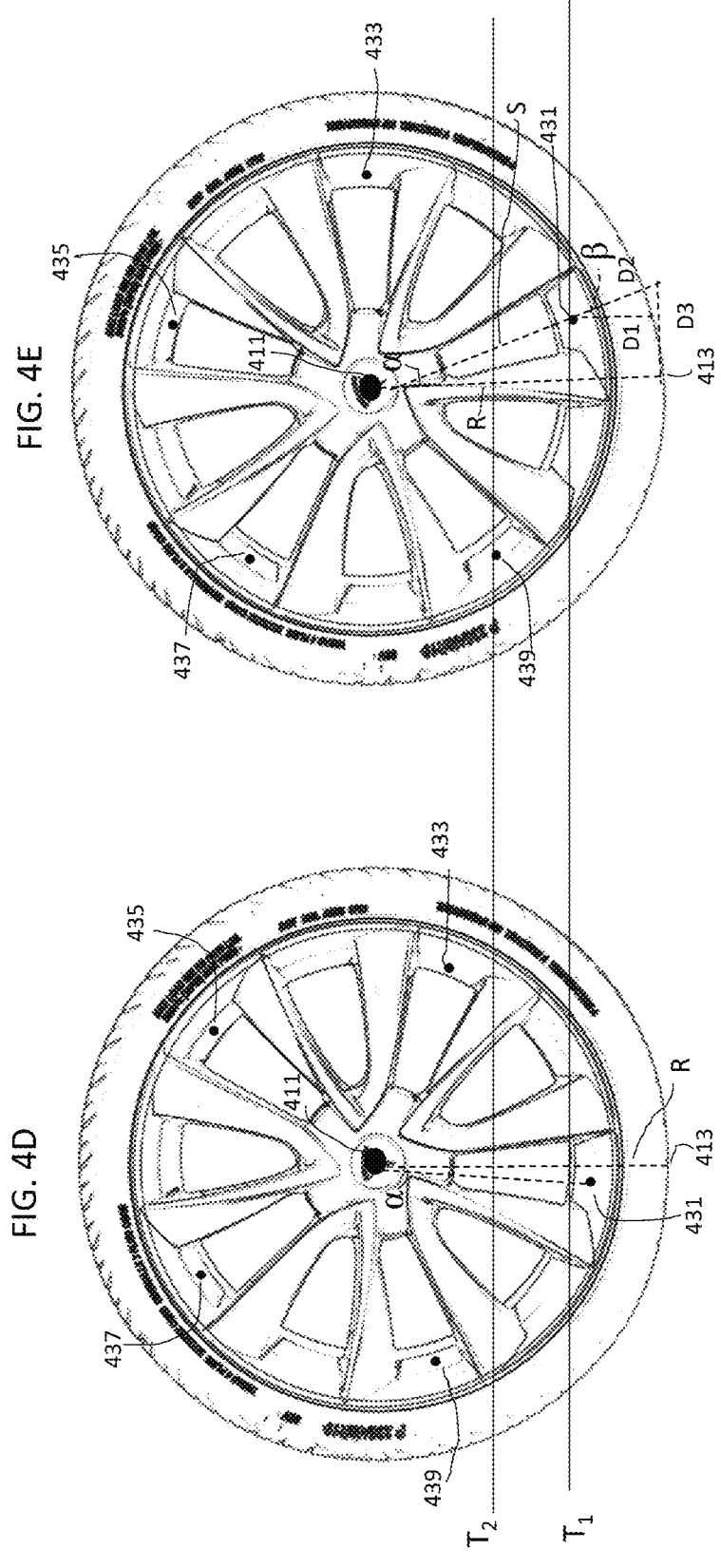

FIGS. 4D and 4E illustrate two rotational positions of the same wheel 401 with two UWS height levels: at a first time $T_1$ and at a subsequent second time $T_2$. UWS sensor 431 is in in contact with the UWS at the first time $T_1$ both when the wheel 401 is in the rotational position shown in FIG. 4D and when the wheel 401 is in the rotational position shown in FIG. 4E. However, when the wheel 401 is in the rotational position shown in FIG. 4D, the UWS sensor 431 contacts the UWS earlier at a time before time $T_1$. At second time T2, on the other hand, in the rotational position shown in FIG. 4D only the UWS sensor 431 is in contact with the UWS while in the rotational position shown in FIG. 4E both the UWS sensors 431 and 439 are in contact with the UWS. Thus, in the rotational position shown in FIG. 4E, first contact with the UWS is signaled later but contact by a second sensor is signaled earlier than in the rotational position shown in FIG. 4D. Due to such uncertainties, the height level of the UWS at the time of first contact with the first UWS sensor has to be determined by calculating D1, the height of the UWS sensor 431 relative to the ground given the current rotational position of the wheel 401.

The rotational position of the wheel 410 may be determined because the ECU 301 may be fed a reading from an orientation sensor of the wheel 401, which may show a deviation of the rotational position from a first rotational position of the wheel 401. The ECU 301 also has access to a memory storing the length of the radius of the wheel 401, which is the distance from the center 411 of the wheel 401 to the ground, assuming the tire is withing a normal tire pressure range. Thus, a vertical line segment R with a length equal to the known radius of the wheel 401 may be drawn from the center of the wheel to the portion 413 of the wheel at the ground, as shown in FIG. 4E. The line segment S with known length may be drawn between the UWS sensor 431 and the center 411 of the wheel 401, since the distance between the UWS sensor 431 and the center 411 of the wheel 401 is known in advance. Based on the known rotational position of the wheel 401, the ECU 301 may determine the angle $\alpha$ between the line segment R and the line segment S. The line segment S plus a line segment D2, as shown in FIG. 4E, form the hypothenuse of a right triangle that is formed with the vertical line segment R and a line segment D3. The line segment D3 is drawn orthogonal to R connecting to the end of this hypothenuse. The length of the line segment D2 is thus equal to length of $R/\cos(\alpha)$– length of S. Thus, based on the angle $\alpha$ and the length of line segment R, the length of the hypothenuse may be calculated.

The line segment D1, which is equal to the height of the UWS sensor 431 relative to the ground, may then be obtained as follows: D2 is the hypothenuse of a smaller triangle formed with D1 and a portion of D3 opposite the angle 3. The angles $\alpha$ and $\beta$ are equal, since D1 is parallel to R, and both D1 and R intersect the line segment S. The length of the line segment D1 may thus be calculated as (length of D2)×cosine($\alpha$). In this way, the height of the UWS level may be obtained because the radius of the wheel and the distance S of each sensor from the center 411 are known in advance, and the orientation of the wheel may be determined based on an indication received from the orientation sensor.

Figure 5:
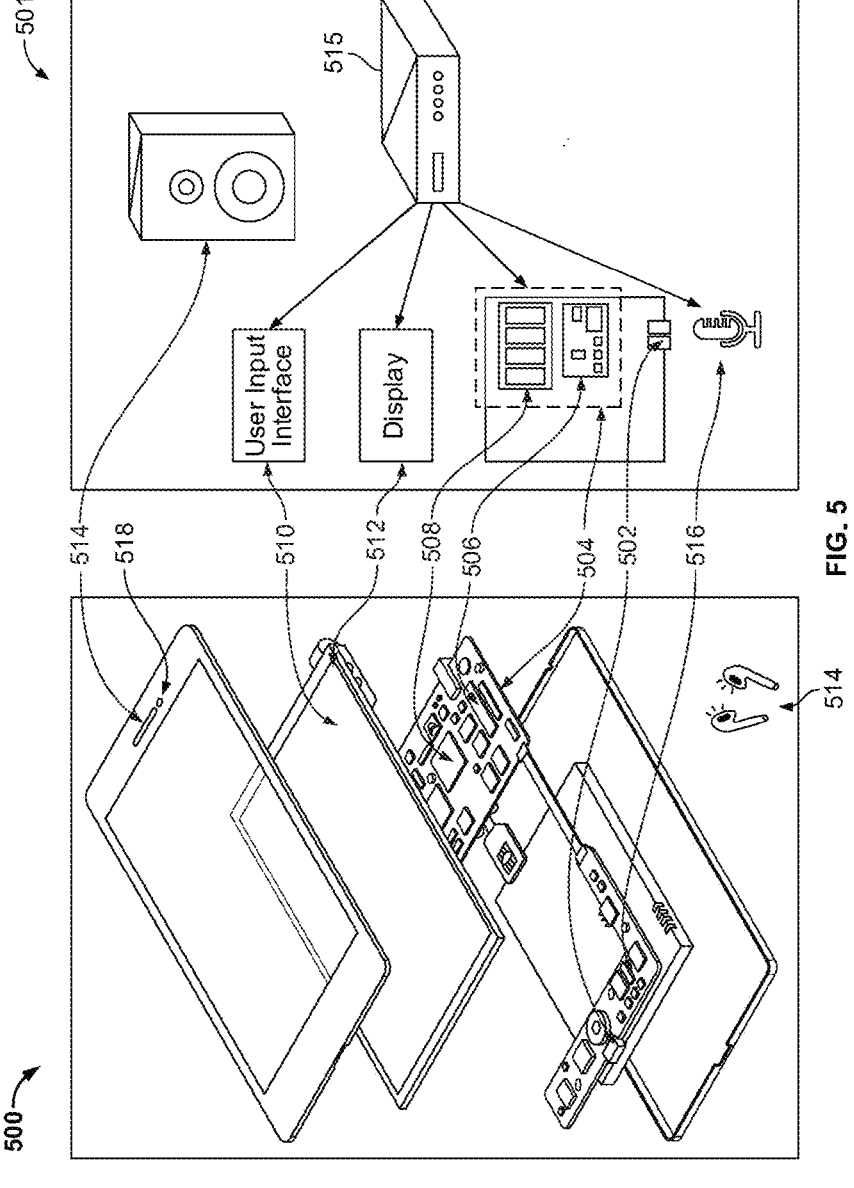
FIG. 5 illustrates a system according to an aspect of the disclosure.

FIG. 5 illustrates an example of an implementation of a system 500, which may comprise an ECU 301 and some components thereof, that may receive vehicle sensor data and driver input and may transmit instructions to various components and systems of the vehicle 201 to control the motion sequences described herein.

System 500 may receive content and data via input/output (I/O) path 502 that may comprise I/O circuitry (e.g., network card, or wireless transceiver). I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry (sometime referred to as com- munication circuitry). I/O path 502 may connect control circuitry 504 (and specifically processing circuitry 506) to one or more communications paths (described below). I/O functions may be provided by one or more of these com- munications paths, but are shown as a single path in FIG. 5 to avoid overcomplicating the drawing.

Control circuitry 504 may be based on any suitable circuitry and may include processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad- core, hexa-core, or any suitable number of cores) or super- computer. In some embodiments, control circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 504 executes instructions for an AR application stored in memory (e.g., storage 508).

In client/server-based embodiments, control circuitry 504 may include communications circuitry suitable for commu- nicating with a server or other networks or servers. Com- puting device 500 may be a part of a local area network with one or more of devices 500 or may be part of a cloud computing environment accessed via the internet. In a cloud computing environment, various types of computing ser- vices for performing searches on the internet or informa- tional databases, providing storage (e.g., for a database) or parsing data (e.g., using machine learning algorithms described above and below) are provided by a collection of network-accessible computing and storage resources (some- times referred to as "the cloud").

Control circuitry 504 may include communications cir- cuitry suitable for communicating with a server, edge com- puting systems and devices, a table or database server, or other networks or servers The instructions for carrying out the above mentioned functionality may be stored on a server. Communications may involve the Internet or any other suitable communication networks or paths. In addition, communications circuitry may include circuitry that enables peer-to-peer communication of user equipment devices, or communication of user equipment devices in locations remote from each other (described in more detail herein).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders, solid state devices, quantum storage devices, gaming consoles, or any other suitable fixed or removable storage devices, and/or any combination of the same. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video and audio and/or audible output generating circuitry and tuning circuitry. Encoding circuitry (e.g., for converting over-the-air, analog, or digital signals to MPEG signals for storage) may also be provided. Control circuitry 504 may also include scaler circuitry for upconverting and down converting content into the preferred output format of system 500. Control circuitry 504 may also include digital-to-analog converter circuitry and analog-to-digital converter circuitry for converting between digital and analog signals. The tuning and encoding circuitry may be used by system 500, 501 to receive and to display, to play, or to record information, such as sensor data. The circuitry described herein, including for example, the tuning, video generating, encoding, decoding, encrypting, decrypting, scaler, and analog/digital circuitry, may be implemented using software running on one or more general purpose or specialized processors.

Control circuitry 504 may receive instruction from a user by way of user input interface 510. User input interface 510 may be any suitable user interface, such as dashboard controllers, an onboard command console or touch screen, a touchpad, stylus input, joystick, voice recognition interface, or other user input interfaces. Display 512 may be provided as a stand-alone device or integrated with other elements of each one of system 500 and devices 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514.

An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Data for use by a thick or thin client implemented on each one of system 500 and devices 501 may be retrieved on-demand by issuing requests to a server remote to each one of system 500 and user equipment devices 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. In this way, the processing of the instructions is performed remotely by the server while the resulting displays (e.g., that may include text, a keyboard, or other visuals) are provided locally on device 500.

Control circuitry may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry executes instructions for an emulation system application stored in memory (e.g., the storage). Memory may be an electronic storage device provided as storage that is part of control circuitry.

Figure 6A:
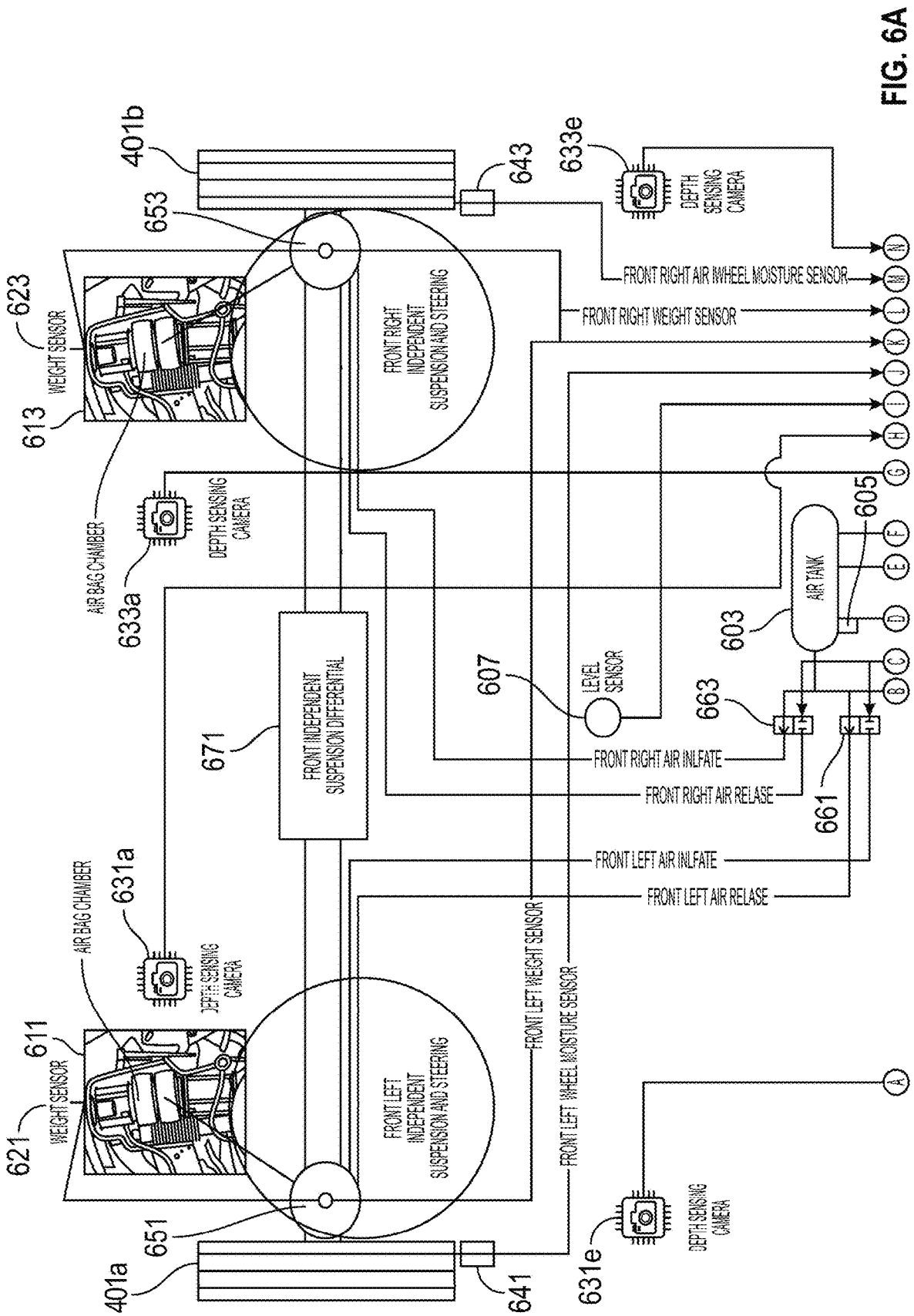
FIGS. 6A and 6B illustrate the ECU, suspension systems, further sensors, and other components of the vehicle, according to an aspect of the disclosure.
Figure 6B:
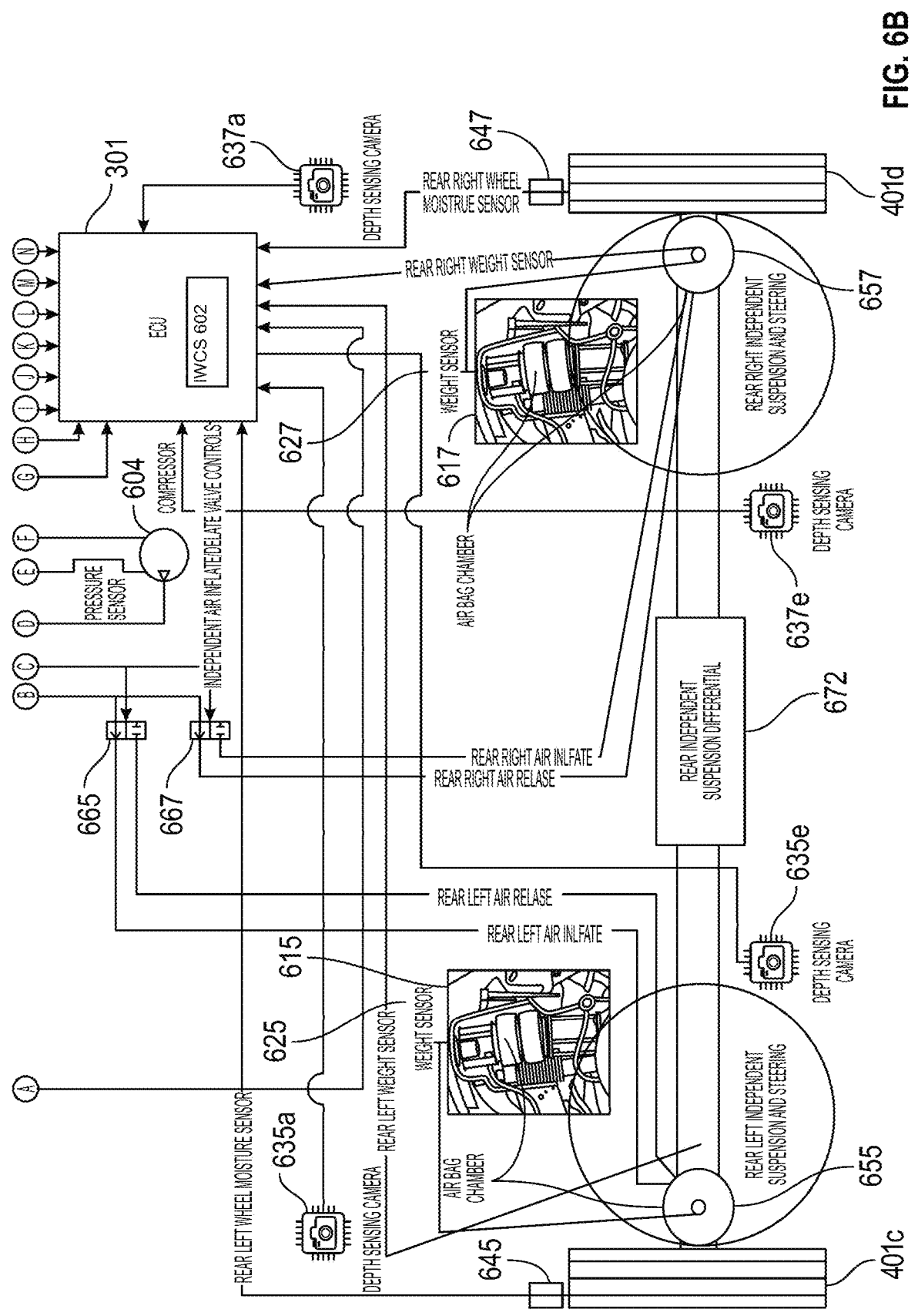

FIGS. 6A-6B show an example of an ECU 301 and vehicle components and sensors according to an aspect of the present disclosure. The suspension systems may include airbag chambers and respective weight sensor 621, 623, 625, 627 connected to the ECU 301. The suspension systems 611, 613, 615, 617 may be controlled by corresponding independence suspension and steering systems 651, 653, 655, 657, respectively, which may be connected to the ECU 301 and managed by independent wheel controller-suspensions (ISCS) 602.

A variety of sensors may also be positioned at various parts of the vehicle, including at a side or underside of the vehicle body, and/or at each wheel, including front left wheel weight sensor 621 and front left wheel moisture sensor 641 provided at or near front left wheel 111, as well as depth sensing cameras 631*a*, 631*b*. Similarly, front right wheel weight sensor 623 and front right wheel moisture sensor 643, as well as depth sensing cameras 633*a*, 633*b* may be provided at or near right front wheel, left rear wheel weight sensor and left rear wheel moisture sensor, as well as depth sensing cameras 635*a*, 635*b* may be provided at or near left rear wheel 115, and right rear wheel weight sensor 627 and right rear wheel moisture sensor 647, as well as depth sensing cameras 637a, 637b may be provided at or near right rear wheel.

Additional sensors, such as additional depth sensing cameras, may be positioned at or near the wheels and/or at various portions of the vehicle, such as at the underside of the vehicle body, for example, air pressure sensors for each wheel (not shown). FIGS. 6A-6B also illustrate other sensors that may also be connected to, or provided integrally formed, with ECU 301, including level sensor 607. FIGS. 6A-6B illustrate air intake and air release lines for controlling air pressure in each wheel. The air intake and air release lines for each wheel are controlled by air pressure control system 661, 663, 665, 667 for respective wheels of the vehicle, connected to air tank 603 provided with compressor 604 and a pressure sensor 605 for managing each of the air inflate and air release lines. They may be fed readings from the pressure sensor 605 to control the compressor 605 and the air tank 603 as well as the air pressure control system 661, 663, 665, 667 for respective suspension systems at the wheels. The UWS sensors 331 comprising electrical resistance sensors are not illustrated in FIGS. 6A-6B.

Figure 7:
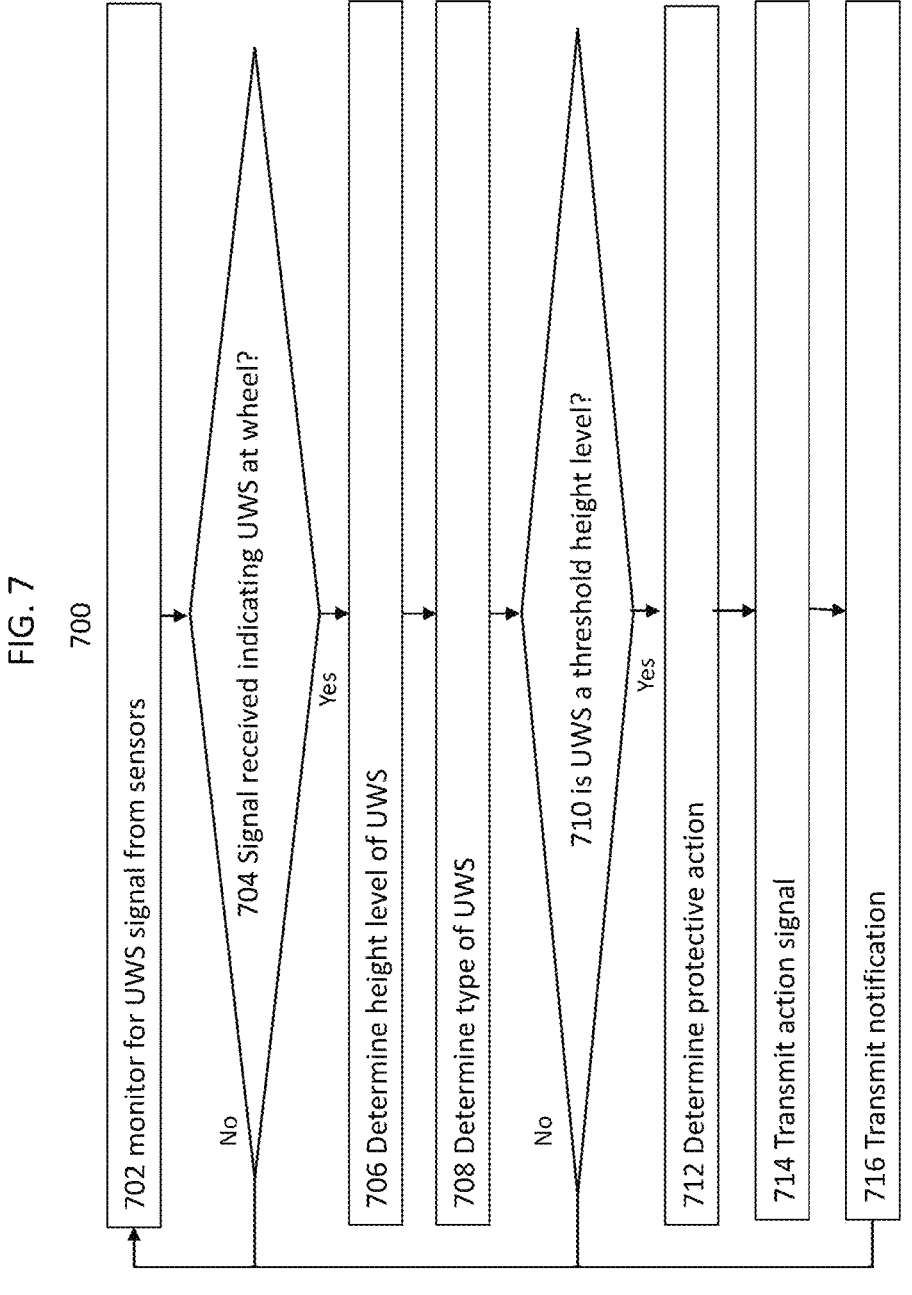
FIG. 7 is a flowchart showing an operation of the system, according to an aspect of the disclosure.

FIG. 7 is a flowchart that illustrates a process according to an aspect of the disclosure. The method 700 may be implemented, in whole or in part, by the system 501 shown in FIG. 5 working in concert with other vehicle components illustrated in FIGS. 3, 6A and 6B. One or more actions of the method 700 may be incorporated into or combined with one or more actions of any other process or embodiments described herein. The method 700, or portions thereof, may be saved to a memory or storage (e.g., of the systems shown in FIG. 5) or locally as one or more instructions or routines, which may be executed by any suitable device or system having access to the memory or storage to implement the method 700.

As shown in FIG. 7, at 702 the system may monitor for a signal from one or more UWS sensors 331 indicating detection of a substance in contact with sensors 331. The system may continue to monitor even after the engine or main motor of the vehicle 201 has been turned off and the driver has left and locked the vehicle. In an embodiment, turning off the engine or main motor, and/or locking the vehicle, and/or detecting that the vehicle is unoccupied, automatically initiates the monitoring.

As shown in FIG. 7, at 704 the system receives from one or more UWS sensors 331 signaling indicating detection of a substance in contact with sensors 331. The UWS sensors may communicate with the ECU 301 via transceiver 333. Data from one or more sensors may be received based on which the ECU may determine whether the sensors signals indicate contact with a substance. If not, then processing returns to 702.

If the ECU 301 determines that the sensors signals indicate contact with a substance, then at 706 the ECU 301 may determine a height level of the substance. Since the ECU 301 knows in advance the positions of the sensors 331 and the distance between them, the ECU 301 may determine the approximate height level of the substance, an example of which is illustrated in FIG. 4. Also, the ECU 301 may store in memory the time at which each UWS sensor transmits its signal and then the ECU 301 may calculate a rate at which the substance is accumulating based on the time at which additional UWS sensors on the wheel 401 subsequently report contact with the substance. Based on the rate of accumulation, the ECU 301 may determine how dire the situation is or is likely to be and take additional protective measures, such as contacting the driver's mobile device 373 via network 363 communicating with the ECU 301 through network communications module 337.

At 708, the ECU 301 may determine a composition of the substance, or at least may determine primary ingredients of the substance. For example if the substance is muddy water, the ECU may determine that the substance is water. The ECU 301 may request data from additional sensors to aid in determining the height level of the substance and/or to aid in determining the composition of the substance. Moisture sensors 641 at the wheels may determine that the wheels are wet, which may facilitate the ECU 301 in determining that the substance is water or another liquid. Cameras 631a-637e may capture photographic or other image data to help identify the substance. A light source (not shown) may be provided to illuminate the area at which the cameras are directed. The cameras may capture images in the IR, UV, RF, visible, microwave and/or other frequency bands.

A machine learning-based module may determine a height level of the UWS, and/or identify the substance in the image(s) captured. In an embodiment, the system may first determine a composition of the UWS and then determine a height level, as knowing the composition of the UWS may aid the image analysis process determine the height level of the substance. The machine learning-based model may be trained in advance and may be located off-vehicle with the ECU 301 transmitting LIDAR or other imaging data in real time to the server 371 via network communications module 337 and network 363 and receiving real time predictions from the model regarding UWS height level and/or UWS composition.

A thermometer or other temperature detecting equipment may aid in identifying the type of substance. For example, if it is determined that the temperature of the substance is significantly less than 0 degrees C. than the system can rule out water in a liquid state (assuming road salt or other chemicals have not been added to lower the melting temperature of the substance).

At 710, the system may determine whether, based on the positions of the sensors that report contact with the substance, the substance reaches a height level that warrants protective action. The threshold high level may be different for various substances detected. For example, when a height level of 10 cm of snow is detected this may be the threshold in response to which the ECU 301 takes the action of lowering the right height of the vehicle body. On the other hand, when a height level of 10 cm of water is detected this may be under the threshold in response to which the ECU 301 takes any action. If the threshold height level for the substance is not detected, then processing returns to 702.

If yes, then at 712, the system may determine an appropriate protective action or set of actions. When a threshold height for snow or sand is detected, then the ECU 301 may determine that suspension systems 621, 623, 625, 627 of the vehicle will lower the vehicle body. Lowering the right height of the vehicle body may prevent the tires of the vehicle from getting stuck in the substance or grounding the vehicle. When a threshold height for water is determined, then the ECU 301 may determine that suspension systems 621, 623, 625, 627 are to elevate the ride height of the vehicle body.

At 714, the ECU 301 transmits instructions to implement such actions. The ECU 301 may communication with adaptive suspension controller 317 to request that the adaptive suspension systems 345a-d at each wheel lower the vehicle body or elevate the vehicle body from a normal or current ride height. The adjusting of the ride height may be a preset amount according to the height level of the substance detected. A maximal ride height or a lowest ride height may be commanded depending on the detected substance height level. In addition to, or instead of, instructions for taking steps to adjust the ride height of the vehicle body, the ECU 301 may instruct other protective actions for the vehicle in responsive to the substance detection. ECU 301 may communicate with the internal and external controller 311 to trigger seal actuators 311 to close seals and/or to signal vent actuators 343 to close vents of the vehicle. The ECU 301 may communicate with the battery isolation controller 313 to trigger the battery isolation unit to close or to isolate the battery or batteries of the vehicle. While sensor data indicating extreme substance accumulation are received, the ECU 301 may communicate with ignition control controller 315 to disable vehicle ignition, and then to enable ignition when the substance accumulation condition is over.

In addition to, or instead of, transmitting signals for taking such steps, at 716 the ECU 301 may communicate via network communications module 337 over network 363 with a mobile device 373 of the driver to report the status of the substance accumulation, including the height level and the composition of the substance, the forecasted rate of substance accumulation or change, weather forecast or weather report data, the state of vehicle protective mechanisms, including seals, vents, battery isolation unit and the adaptive suspension systems, and/or to request instructions regarding any of these protective actions. Communication to the mobile device 373 may also warn against entering the vehicle and/or opening doors/windows of the vehicle. Similarly, the electronic control unit ECU 301 may communicate with a server 371 of an emergency response organization, such as a fire department or private vehicle protection organization, and/or with tow truck operators, roadside assistance personnel, or automated roadside assistance notification centers, to provide such status reports and to request further instructions regarding protective actions to take for the vehicle. The network communications module 337 may be connected to a cellular mobile telephone carrier system via radio cell towers. In response, the server 371 and/or the mobile device 373 may transmit to the a command ECU 301 to implement, or to continue to implement some or all vehicle protection actions as programmed, or to stand down and to disable vehicle protection actions. Also, the server 371 and/or the mobile device 373 may transmit to the a command ECU 301 to reverse some or all of the protective actions taken, for example, if a threat to the vehicle is deemed not be real, or when the threat is deemed to have passed.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A vehicle wheel comprising:
   a first sensor positioned at a rim of the wheel at a first distance from a center of the wheel, wherein the first sensor comprises first probes configured to detect electrical conductivity of a substance in contact with the wheel;
   a second sensor positioned at the rim of the wheel at the first distance from the center of the wheel and spaced remote from the first sensor, wherein the second sensor comprises second probes configured to detect the electrical conductivity of the substance in contact with the wheel; and
   a wireless transmitter configured to transmit signals indicating the electrical conductivity detected by the first sensor and the electrical conductivity detected by the second sensor.

2. The vehicle wheel of claim 1, wherein the first sensor and the second sensor each comprise a temperature sensor.

3. The vehicle wheel of claim 1, further comprising an orientation sensor configured to detect an orientation of the wheel.

4. The vehicle wheel of claim 1, further comprising a third sensor positioned at the rim of the wheel at the first distance from the center of the wheel and spaced equidistant from the first sensor and from the second sensor,
   wherein the first sensor is positioned equidistant from the second sensor and from the third sensor,
   wherein the third sensor comprises third probes configured to detect the electrical conductivity of the substance in contact with the wheel.

5. The vehicle wheel of claim 4, wherein one probe of the first probes of the first sensor is positioned at an inner ring of the rim of the wheel, and another probe of the second probes of the second sensor is positioned at an outer ring of the of the rim of the wheel.

6. A system comprising the vehicle wheel of claim 1, further comprising:
   an onboard data processor positioned and configured to receive the signals indicating the electrical conductivity detected by the first sensor and the electrical conductivity detected by the second sensor,
   wherein the onboard data processor is configured to determine a protective action for the vehicle based on the signals received.

7. A method comprising:
   detecting, by a first sensor positioned at a rim of a wheel of a vehicle, electrical conductivity of a substance in contact with the wheel, wherein the first sensor is at a first distance from a center of the wheel and comprises first probes;
   detecting, by a second sensor positioned at the rim of the wheel, the electrical conductivity of the substance in contact with the wheel, wherein the second sensor is at the first distance from the center of the wheel and spaced remote from the first sensor, wherein the second sensor comprises second probes;

transmitting, by a wireless transmitter, signals indicating the electrical conductivity detected by the first sensor and the electrical conductivity detected by the second sensor;

receiving by an onboard data processor the signals indicating the electrical conductivity detected by the first sensor and the electrical conductivity detected by the second sensor;

determining, by the onboard data processor, a protective action for the vehicle based on the signals received; and causing the onboard data processor to transmit signals to cause at least one system of the vehicle to take the protective action for the vehicle.

8. The method of claim 7, further comprising taking, by the at least one system of the vehicle, the protective action for the vehicle.

9. The method of claim 8, wherein the at least one system comprises an adjustable suspension.

10. The method of claim 7, wherein the protective action comprises lowering the vehicle when the substance in contact with the wheel comprises a solid.

11. The method of claim 10, wherein the substance in contact with the wheel comprises snow.

12. The method of claim 7, wherein the protective action comprises raising the vehicle when the substance in contact with the wheel comprises a liquid.

13. The method of claim 12, wherein the substance in contact with the wheel comprises water.

14. The method of claim 7, wherein the determining of the protective action for the vehicle is based at least in part on determining that the substance is in contact with the first sensor and with the second sensor.

15. The method of claim 7, wherein the determining of the protective action for the vehicle is based at least in part on determining a type of substance that is in contact with the wheel.

16. The method of claim 7, wherein the determining of the protective action for the vehicle is based at least in part on determining that the substance in contact with the wheel comprises liquid.

17. The method of claim 7, wherein the determining of the protective action for the vehicle is based at least in part on determining a protective ride height of the vehicle.

18. The method of claim 7, wherein the determining of the protective action for the vehicle is based at least in part on:

determining, at a first time, that the substance is in contact with the first sensor and that the second sensor is free of contact with the substance;

determining, at a second time subsequent to the first time, that the first sensor and the second sensor are both in contact with the substance.

19. The method of claim 18, further comprising determining an accumulation rate of the substance in contact with the wheel based on a time interval between the first time and the second time.

20. The method of claim 7, further comprising transmitting, to a device remote from the vehicle, a notification indicating substance accumulation at the vehicle.

* * * * *